(12) United States Patent
Droz et al.

(10) Patent No.: US 8,227,001 B2
(45) Date of Patent: Jul. 24, 2012

(54) MEAT TRUSSING SYSTEM

(75) Inventors: Daniel Droz, Pittsburgh, PA (US); Donald G. Sartore, Cranberry Township, PA (US); William L. Sartore, Bethel Park, PA (US)

(73) Assignee: JetNet Corporation, Sewickley, PA (US)

( * ) Notice: Subject to any disclaimer, the term of this patent is extended or adjusted under 35 U.S.C. 154(b) by 517 days.

(21) Appl. No.: 12/408,885

(22) Filed: Mar. 23, 2009

(65) Prior Publication Data

US 2010/0239732 A1 Sep. 23, 2010

(51) Int. Cl.
B65B 25/06 (2006.01)
(52) U.S. Cl. .......................... 426/129; 426/106; 383/117
(58) Field of Classification Search .................. 206/527, 206/802; 426/106, 129, 410, 112, 113, 412; 229/87.05, 87.11; 383/119, 209, 117
See application file for complete search history.

(56) References Cited

U.S. PATENT DOCUMENTS

| | | | |
|---|---|---|---|
| 1,036,839 A | | 8/1912 | Hasselblad |
| 2,057,122 A * | 10/1936 | Trevellyan | 206/410 |
| 2,384,462 A * | 9/1945 | Goodman | 138/118.1 |
| 2,897,087 A * | 7/1959 | Lawlor | 229/87.05 |
| 3,101,885 A * | 8/1963 | Walsh | 229/201 |
| 3,109,576 A * | 11/1963 | Karl | 229/201 |
| 3,126,797 A * | 3/1964 | Carpenter et al. | 493/85 |
| 3,268,343 A | 8/1966 | Stock | |
| 3,290,841 A | 12/1966 | Sartore | |
| 3,343,747 A * | 9/1967 | Molins | 229/123.2 |
| 3,347,156 A | 10/1967 | Stock | |
| 3,379,360 A * | 4/1968 | Crossley | 383/66 |
| 3,420,366 A * | 1/1969 | Doyle | 206/436 |
| 3,477,860 A | 11/1969 | Sartore | |
| 3,620,439 A * | 11/1971 | Morse et al. | 229/208 |
| 3,653,926 A | 4/1972 | Armellino | |
| 4,091,929 A * | 5/1978 | Krane | 229/101.1 |
| 4,133,164 A | 1/1979 | Mintz | |
| 4,621,482 A | 11/1986 | Crevasse et al. | |
| 4,648,509 A * | 3/1987 | Alves | 229/164.1 |
| 4,716,713 A | 1/1988 | Crevasse et al. | |
| 4,762,233 A * | 8/1988 | Sears et al. | 229/101.2 |
| 5,409,115 A * | 4/1995 | Barkhorn | 206/440 |
| 5,413,148 A | 5/1995 | Mintz et al. | |
| 5,654,023 A * | 8/1997 | Secord | 426/412 |

(Continued)

FOREIGN PATENT DOCUMENTS

JP 1269472 10/1989

*Primary Examiner* — David Fidei
(74) *Attorney, Agent, or Firm* — Metz Lewis Brodman Must O'Keefe LLC; Barry I. Friedman

(57) ABSTRACT

A meat trussing system is provided which incorporates the use of an elastomeric net to receive and restrain meats and other food components, both unitary and combinations including independent meat and/or food elements. At least one flexible wrapper is provided into which the meat and/or food products are encased forming a cylindrical circumferential wrap having a low coefficient of friction with respect to the elastomeric net. The wrapper permits a relatively easy insertion of the wrapped food products into the elastomeric net. The wrapper is preferably provided with at least one perforation adapted to be circumferentially disposed near the midpoint of the food products within the elastomeric net. A method of use includes the deformation of the meat and/or food product. In order to sever the perforation which permits the relatively easy removal of the now separated wrapper portions from between the meat and/or food products and the elastomeric net.

10 Claims, 8 Drawing Sheets

U.S. PATENT DOCUMENTS

| | | |
|---|---|---|
| 6,180,150 B1 | 1/2001 | Schafer |
| 6,708,742 B2 | 3/2004 | Weathers et al. |
| 6,824,846 B1 | 11/2004 | Meixner |
| 7,234,287 B2 | 6/2007 | Griggs et al. |
| 2004/0219284 A1 | 11/2004 | Bruno |
| 2005/0126403 A1 | 6/2005 | Lopez |
| 2005/0284108 A1 | 12/2005 | Griggs et al. |
| 2010/0067832 A1* | 3/2010 | Czarny et al. ............... 383/206 |

* cited by examiner

MEAT TRUSSING SYSTEM

BACKGROUND OF THE INVENTION

1. Field of the Invention

This invention is directed to a system for wrapping meat and other related products prior to cooking. More specifically, the system relates to an apparatus and method for insertion of a roast or other irregularly shaped food product into a preformed net truss which will receive and restrain the food product during the cooking process.

2. Description of the Prior Art

It is desirable during the cooking of meats and other products to achieve an even and uniform application of heat to the product so that the food product will rise to the desired internal temperature in a uniform manner which is evenly distributed throughout. Unfortunately, most food products and more particularly, most meat products are butchered from naturally occurring muscle groups within the animal such that the meat sections are of unique and irregular geometries. Furthermore, it is sometimes necessary or desirable to combine independent sections of meat or other food products into a single combined mass for cooking. Lastly, it may be desirable to insert other non-uniform food products such as stuffing, vegetables or the like into the meat or other food product and cause the surrounding meat or food products to encompass or encircle the stuffed material during cooking. In each of these situations it is either necessary or desirable to form the meat product into the most uniform mass possible which also may contain the non-uniform or disparate food materials therein. In accordance with the prior art, it is well known to utilize various string or other elongated products, such as butcher's twine, to truss the food products. For the purpose of the remainder of this discussion, the generic term "roast" shall be used to identify all food products which are intended for cooking. It is to be specifically understood that roast shall include meats of all types as well as other non-meat food products which may be unitary in construction or comprised of a variety of independent meat or food components. Roast shall also be deemed to include those products which are rolled or stuffed in order to contain other non-meat products. Additionally, seasonings, flavorings or other additives may be applied to the outside surface of the food products.

Referring now to FIG. 1(a) roast 1 as illustrated in subfigure A is shown having a large roast end 5 and a narrow roast end 10. This is intended to illustrate a typical non-uniform cut of meat which, if cooked in its native form, would cause narrow roast end 10 to achieve a desired internal temperature much more quickly than large roast in 5. The cook is faced with the dilemma of dividing the meat into sections or achieving a desirable internal temperature at large roast end 5 while allowing narrow roast in 10 to be completed comparatively overcooked.

A typical remedy for achieving a more uniform roast geometry is to fold, slice or otherwise manipulate the roast product to create a more uniform shape as shown in subfigure B in which, as an example, narrow roast end 10 has been folded over adjacent large roast end 5. Butcher's twine 15 is wrapped circumferentially around roast 1 in order to restrain the various components or meat portions of roast 1. During the cooking process, as is well known to those skilled in the art, the butcher's twine 15 is manipulated through a series of knots 12 to create a meat truss 20 as shown in subfigure C. While subfigure B specifically illustrates a roast which has been folded and subfigure C illustrates a roast which has been rolled and may be stuffed with stuffing 13, it is also specifically intended that disparate meat components formed of individual meat sections may be combined and trussed with meat truss 20 as well. Flavorings, seasonings or other additives may be applied to the exterior surface.

As is well known to those skilled in the art, the wrapping and trussing of roast 1 is an operation which requires significant dexterity and practice in order to achieve consistent and uniform results. While such trussing may be commonplace among chefs and experienced cooks, for those of lesser skill and experience, this operation presents significant difficulties and in many cases a barrier to the preparation of roasts or food products of this nature.

In commercial or industrial meat packing operations it is also well known to utilize a pre-formed net, which may be elastomeric, to truss meats as illustrated in U.S. Pat. No. 3,477,860, issued Nov. 11, 1969, to M. A. Sartore, entitled "Method for Netting Meat." This reference illustrates and describes a method and apparatus for providing an elastomeric preformed net which is adapted to receive and restrain the roast product in the desired uniform shape during cooking. The roast is inserted into the net through the use of a rigid preformed funnel which receives and compresses the roast to a size which easily fits within the preformed elastomeric netting. It also permits the easy insertion of the roast into the elastomeric netting by delivering the roast through the narrow end of the funnel into a far end of the elastomeric netting and allowing the movement of the roast through the funnel to draw the remainder of the preformed elastomeric netting across the length of the roast.

A variety of other references include a number of refinements for delivering a roast into such an elastomeric preformed net. Stock, U.S. Pat. No. 3,347,156 issued Oct. 17, 1967, describes an apparatus for preparing a trussed, boned fowl portion which includes the use of a particularly designed spatula which receives and restrains a meat portion already trussed in butcher's twine for insertion into an elastomeric net product. One of the shortcomings of the use of the elastomeric net product is the significant amount of friction encountered while inserting the roast product into the elastomeric net which is typically designed to exert an inward force on the exterior surface of the roast. Because of this design, overexpansion of the elastomeric net is necessary in order to reduce the resistance to the insertion of the roast product into the net. The Stock reference utilizes a preformed rigid frame which is inserted into the elastomeric net and permits the insertion of the roast utilizing the spatula.

The shortcomings of the above approaches to utilization of the elastomeric net product require a significant investment of both equipment and space in order to provide an insertion system for the roast which overcomes the inherent friction created by the elastomeric net. While it is certainly possible to merely force the roast into the net using an individual's hands, this generally defeats the ultimate purpose of creating a uniform and neatly packaged roast which will appear presentable once cooked for slicing and serving.

What is lacking in the art therefore, is a method or apparatus which permits the easy insertion of a roast into an elastomeric net product and which requires little in the way of bulky or expensive equipment unsuitable for home or restaurant use where the investment of such equipment would not be considered appropriate.

SUMMARY OF THE INVENTION

A meat trussing system is disclosed which enables a low volume, i.e., home or restaurant user to enjoy the benefits of the net truss commonly utilized in commercial or industrial settings in a low volume environment. The system provides that at least one, but also a plurality of low friction wrapping sheets are utilized for encasing the roast product once it has been formed of its individual meat components or rolled with the appropriate fillings or external seasonings. The roast product is assembled on the appropriate wrapping sheet or sheets and the same are circumferentially extended around the entire outer surface of the roast in roughly cylindrical geometry. An adhesive may optionally be provided to permit the sealing or other connection of the ends of the wrapping sheet or sheets in order to form a stable cylindrical mass which requires no further restraint. The wrapping sheets are preferably transparent and formed of a food grade plastic, collagen or other flexible material having a low coefficient of friction but having enough structural integrity and resiliency to receive and restrain the meat products in a relatively compact and tight package. The wrapping sheet is preferably provided with a circumferential perforation which is intended to be located roughly near the center of the roast mass. The wrapped roast is then inserted into the net truss product through one of its end openings and the net product is extended longitudinally along the entire length of the roast by sliding over the wrapping sheets. Once the wrapped roast is located entirely within the net truss, the wrapped roast may be bent or otherwise displaced in such a way to cause the circumferential perforation of the wrapping sheets to separate and the now divided wrapping sheets may be removed from their position between the roast and the elastomeric net product by pulling each from the respective ends of the roast inside the net truss. Once removed, the wrapping sheets are discarded and the roast now resides entirely within the net truss product and may be cooked as appropriate.

BRIEF DESCRIPTION OF THE DRAWINGS

The aforementioned invention will be appreciated from the following description and accompanying drawings.

FIG. 1(a) is a side elevational view of a prior art roast in its native form.

FIG. 1(b) illustrates a prior art roast in the process of being trussed in a side elevational view.

FIG. 1(c) is an isometric figure of a prior art roast encased in a prior art truss.

DETAILED DESCRIPTION OF THE PREFERRED EMBODIMENTS

Figure 1:
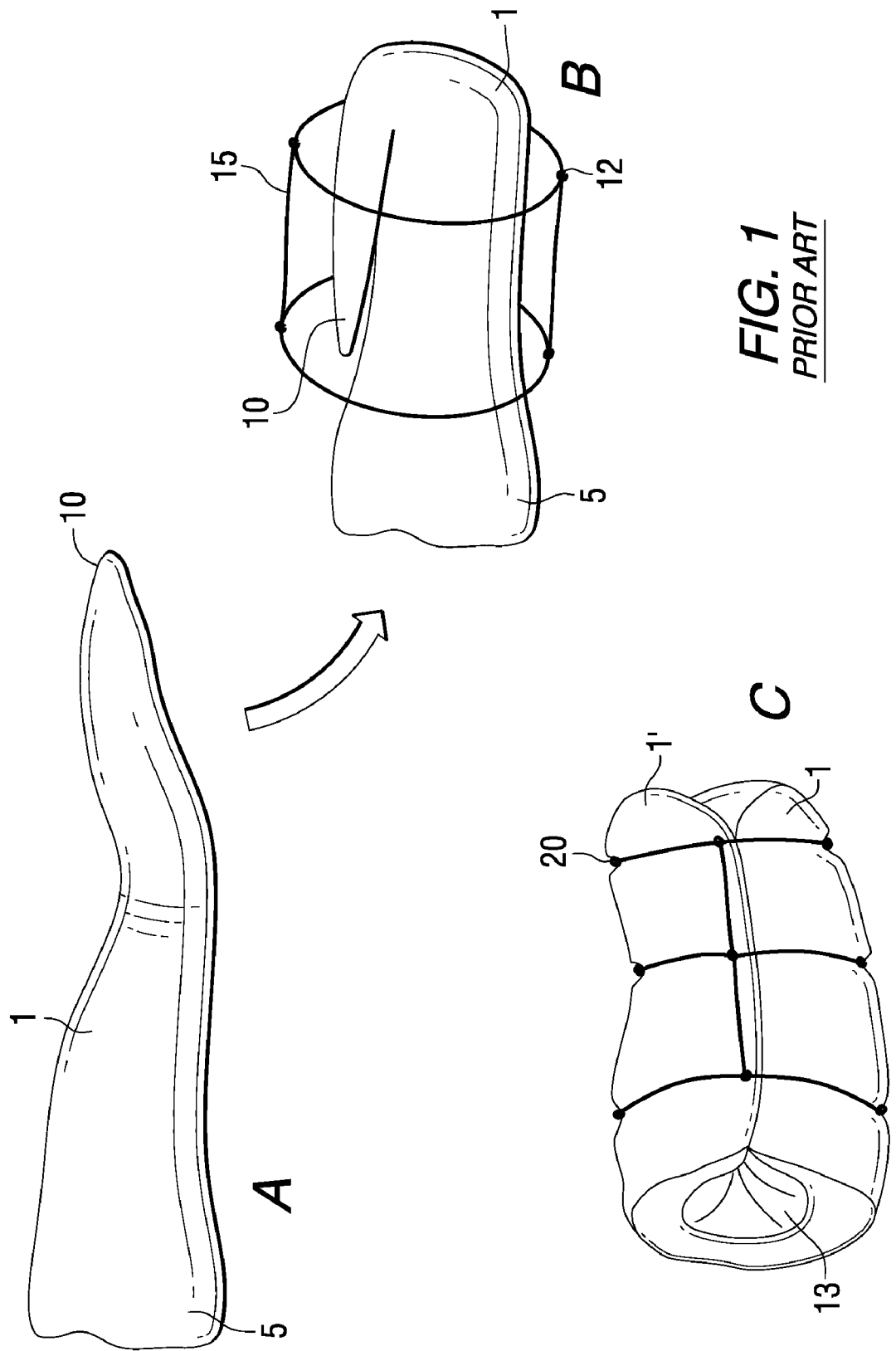
FIG. 1 provides a variety of views of a prior art roast.
Figure 2:
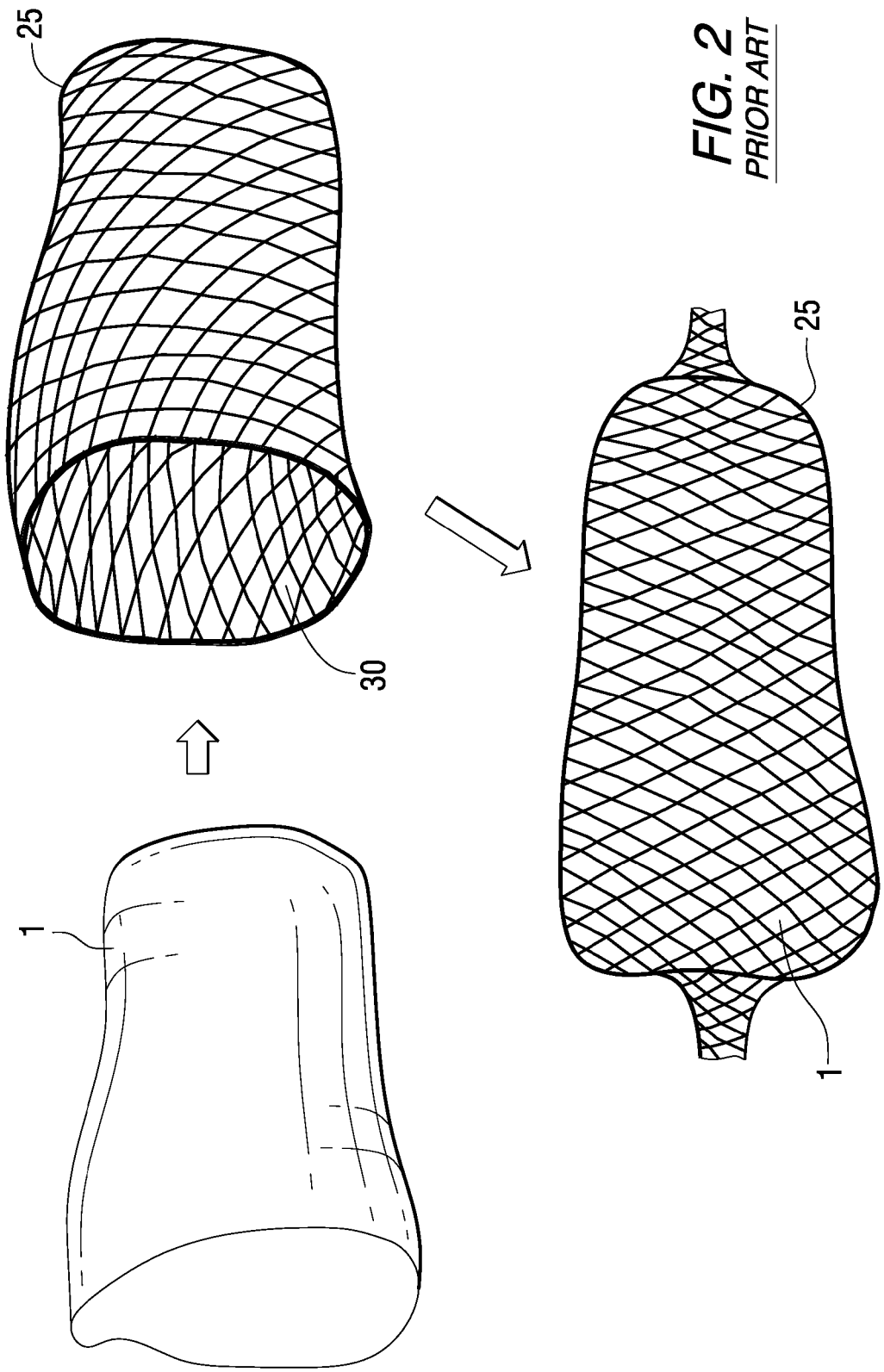
FIG. 2 provides isometric inside elevational views of a prior art roast in association with a net truss.
Figure 3:
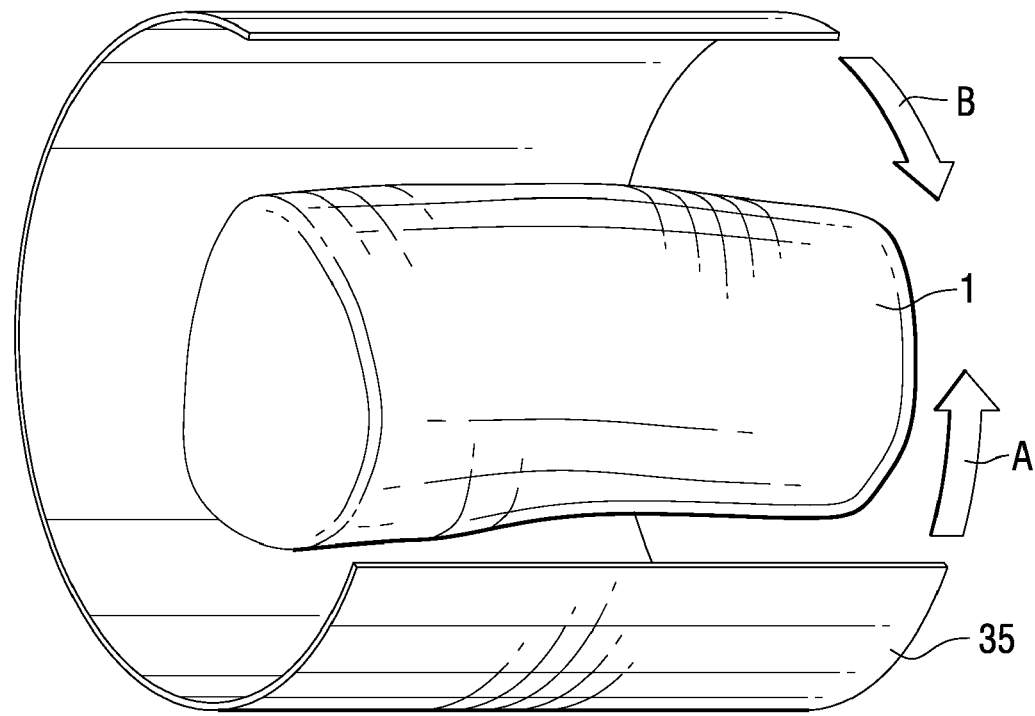
FIG. 3 provides an isometric view of a roast in the process of being encased by a first embodiment of the wrapping material.
Figure 4:
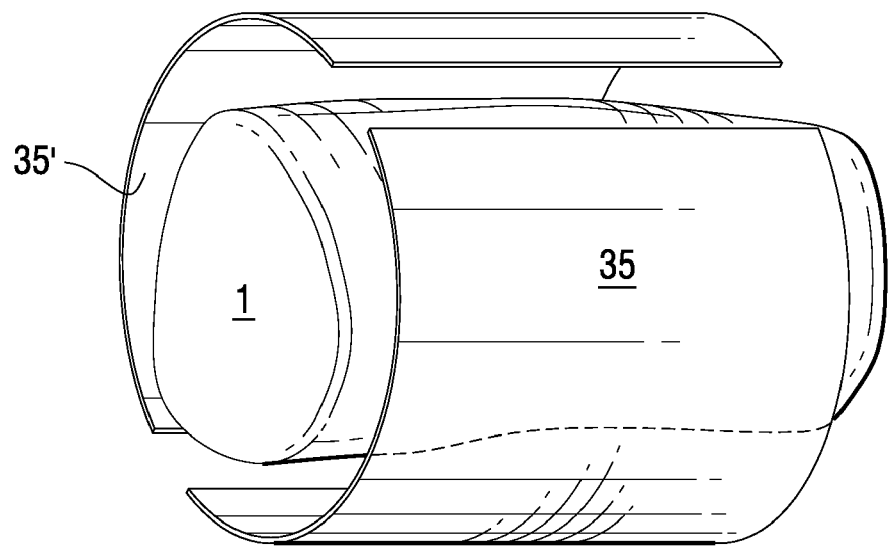
FIG. 4 provides an isometric view of a roast encased in a second embodiment of the wrapping sheets.

Referring now to FIG. 2, it is a goal of the meat trussing process to insert roast 1 within net truss 25, which is preferably elastomeric, through net truss opening 30 causing the roast to be interposed entirely within net truss 25 as discussed above. The primary impediment to such insertion is the frictional forces exerted upon the roast 1 by elastomeric net 25 during the insertion. Referring now to FIG. 3, roast 1 is inserted and surrounded by wrapper 35. This is typically accomplished by placing wrapper 35 on a counter or other flat surface and assembling the roast and its components thereupon. The ends of wrapper 35 may then be lifted and adjusted circumferentially as shown by arrows A and B to surround the roast material. It is within the skill of those knowledgeable in the art to adapt the roast into any appropriate shape for the ultimate cooking procedure and to further ensure that the wrapper completely encircles the meat product to allow for insertion within the elastomeric netting. As shown in FIG. 4, in the event that the roast is of a particularly large size or at the discretion of the user, a second embodiment including a plurality of wrappers 35 and 35' may be utilized to circumferentially encircle the roast 1.

Figure 4B:
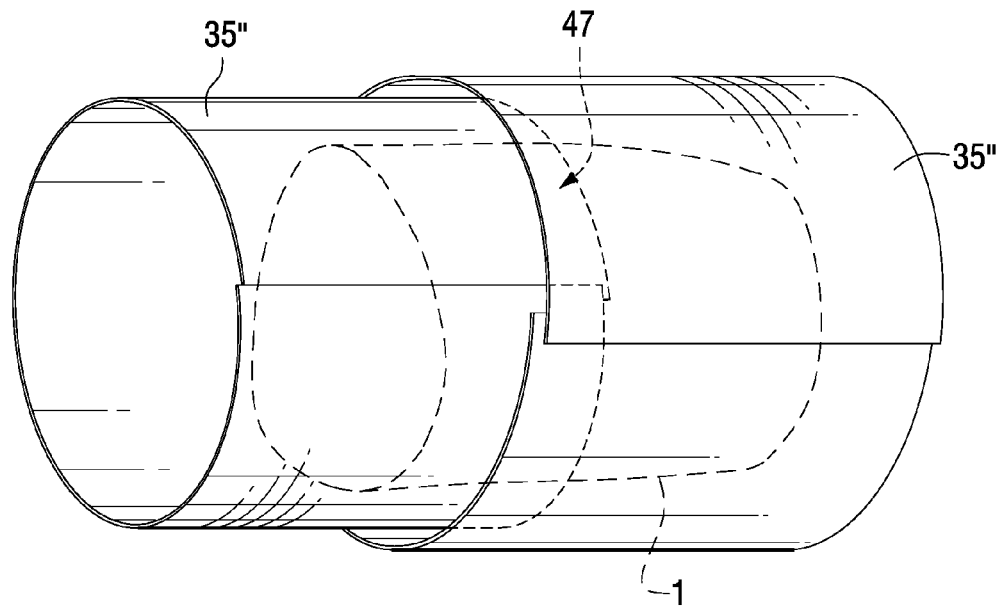
FIG. 4B provides an isometric view of a roast encased in a third embodiment of the wrapping sheets.

Referring now to FIG. 4B, a second embodiment of the wrapping sheets are illustrated which utilize two wrapping sheets 35" which are longitudinally overlapped forming an overlap zone 47. This overlap zone 47 provides similar functionality as perforation line 40, allowing selective separation of wrapping sheets 35" after insertion into elastomeric net 25.

Figure 5:
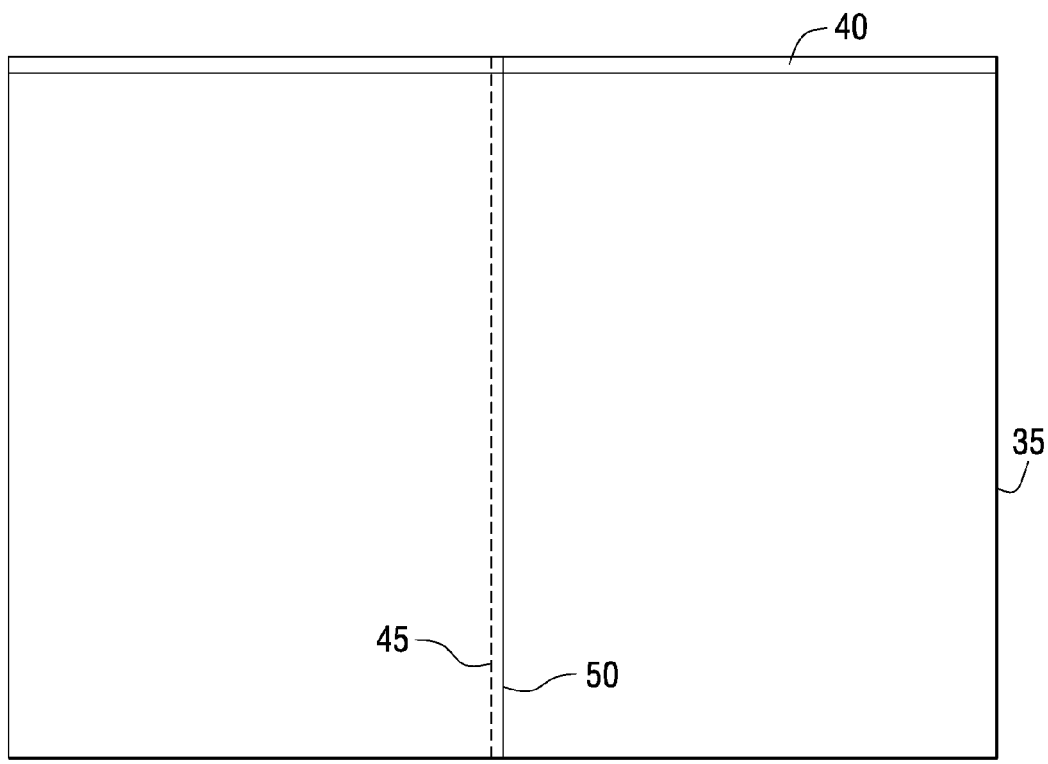
FIG. 5 illustrates a top plain view of a first embodiment of the wrapping sheets.
Figure 5B:
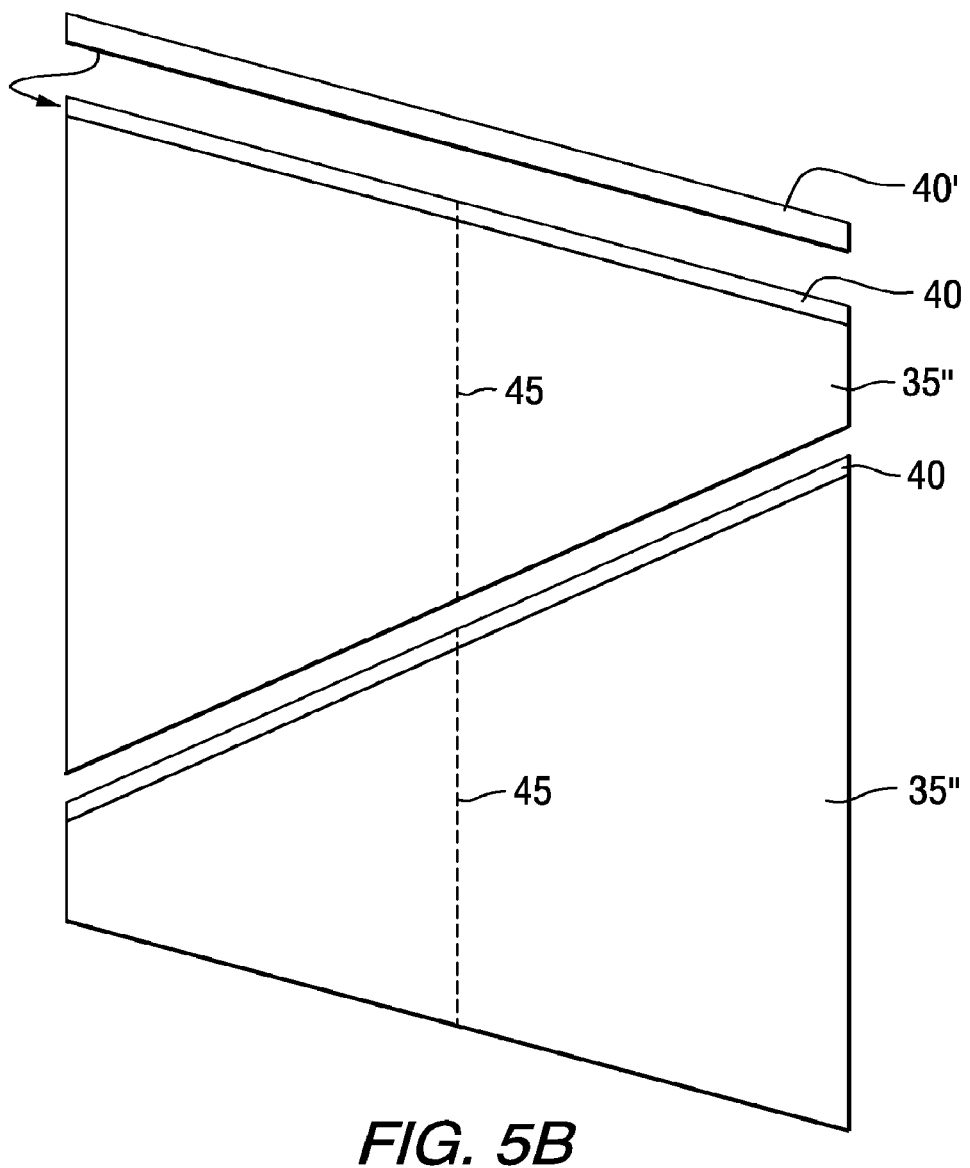
FIG. 5B illustrates a top plan view of a fourth embodiment of the wrapping sheets.

Referring now to FIG. 5, wrapper 35 is illustrated having a number of features all of which are preferred but may be considered optional with minor exceptions. Preferably an adhesive strip 40 is affixed along at least one edge of the wrapper 35 and may optionally be provided with a removable covering (not shown) in order to shield the adhesive material during application. Referring now to FIGS. 3, 4 and 5, the adhesive strip 40 is adapted to facilitate the affixation of the ends of the wrapper or wrappers 35, 35 prime and to temporarily restrain wrappers 30, 35' to the outside surface of the roast 1. Referring now to FIG. 5, wrapper 35 is preferably comprised of a transparent or translucent flexible plastic material of food grade quality such as biaxially oriented polypropylene, cellophane, polyethylene, silicone, coated fabric, Teflon, mylar, vinyl wax or other coated papers or polymers of 0.6-12 mm thickness, and is provided with an adhesive strip 40 along at least one edge for affixing wrapper 35 into a cylindrical shape while wrapper 35 is shown in a generally rectangular geometry, it is specifically contemplated that the shape of the wrapper 35 may be of any particular shape or dimension and adapted to the particular application. A fourth embodiment of the wrappers 35'" are illustrated in FIG. 5B, having a trapezoidal geometry for forming a cone encasing roast 1. A roll of wrappers 35 of any shape may be formed for easy manufacture and/or dispensing. Referring again to FIGS. 5 and 5B, wrapper 35 is provided with perforation line 45 which is typically aligned at the midpoint of the wrapper. Reference line 50 is optionally applied to assist the user in locating perforation line 45 at a point generally central to the mass of the roast 1.

Figure 6:
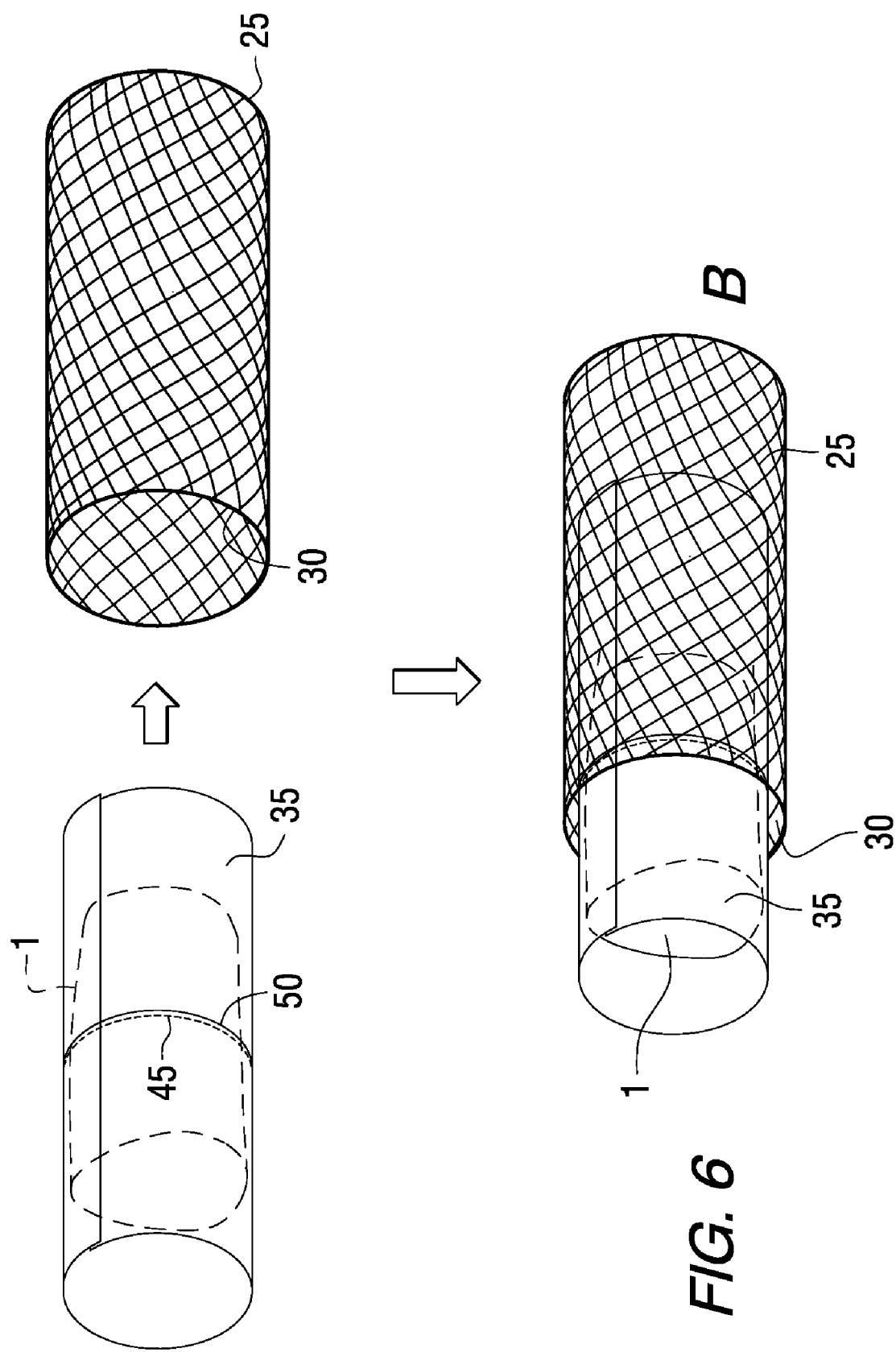
FIG. 6 provides a series of isometric views illustrating the insertion of the wrapped roast into the net truss.

Referring now to FIG. 6, roast 1, shown in chain line, is encircled by wrapper 35 in the generally cylindrical shape identified earlier. Roast 1 is shown as having perforation line 45 and reference line 50 centrally located along its length. Roast 1 having wrapper 35 attached thereto is positioned for insertion into elastomeric net truss 25 having net truss opening 30 positioned adjacent the end of wrapper 35. In operation the user would extend net truss opening 30 by hand around the edge of wrapper 35 and then slide net truss 25 over the exterior surface of this cylindrically wrapped roast 1. The low coefficient of friction of wrapper 35 permits the easy positioning of net truss 25 along the length of roast 1 having wrapper 35 encircling it. FIG. 6 further illustrates in subfigure B roast 1 almost entirely inserted within elastomeric net 25 with a portion of wrapper 35 extending therefrom through net truss opening 30.

Figure 7:
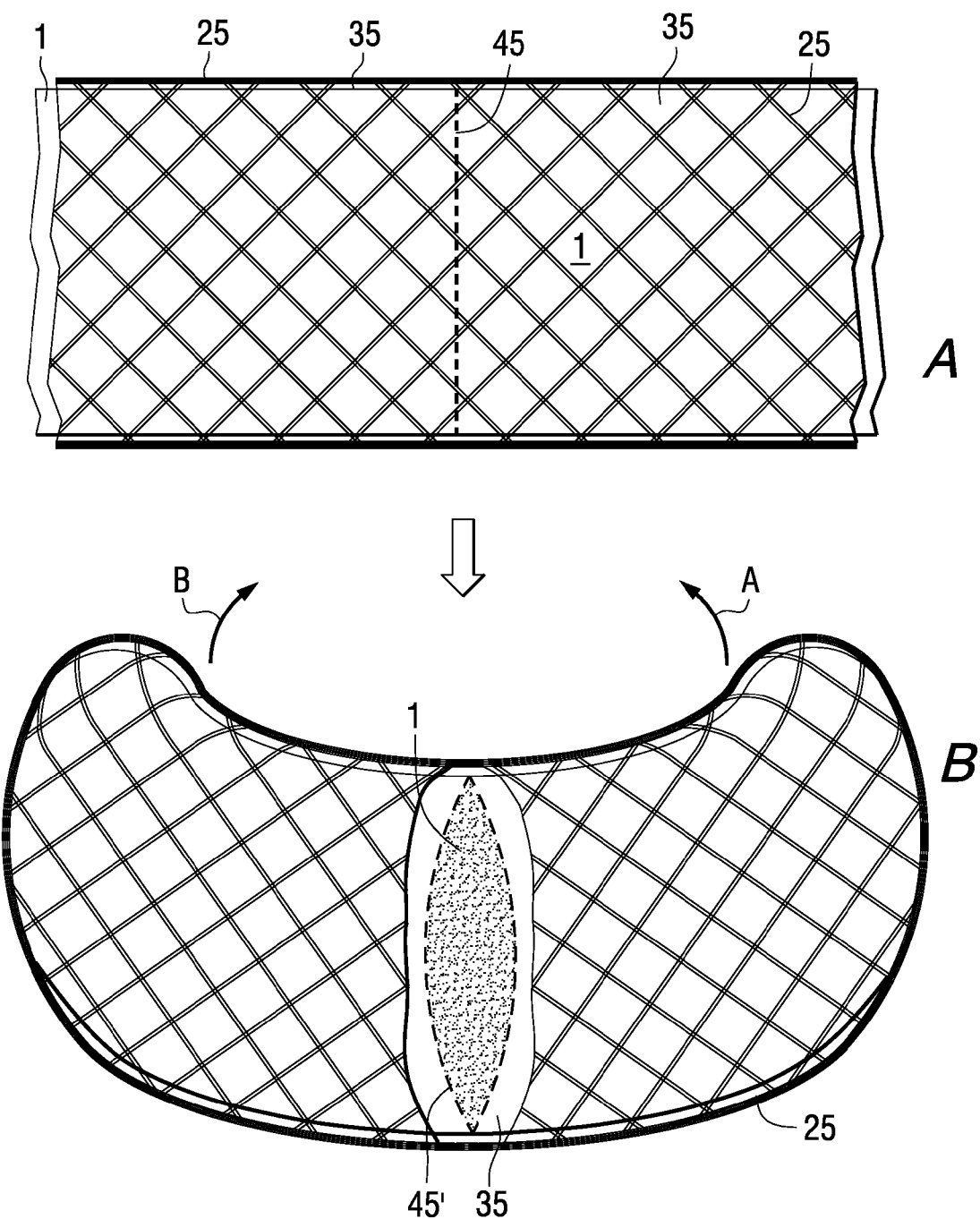
FIG. 7 provides a series of side elevational views of the inserted roast within the net truss.
Figure 8:
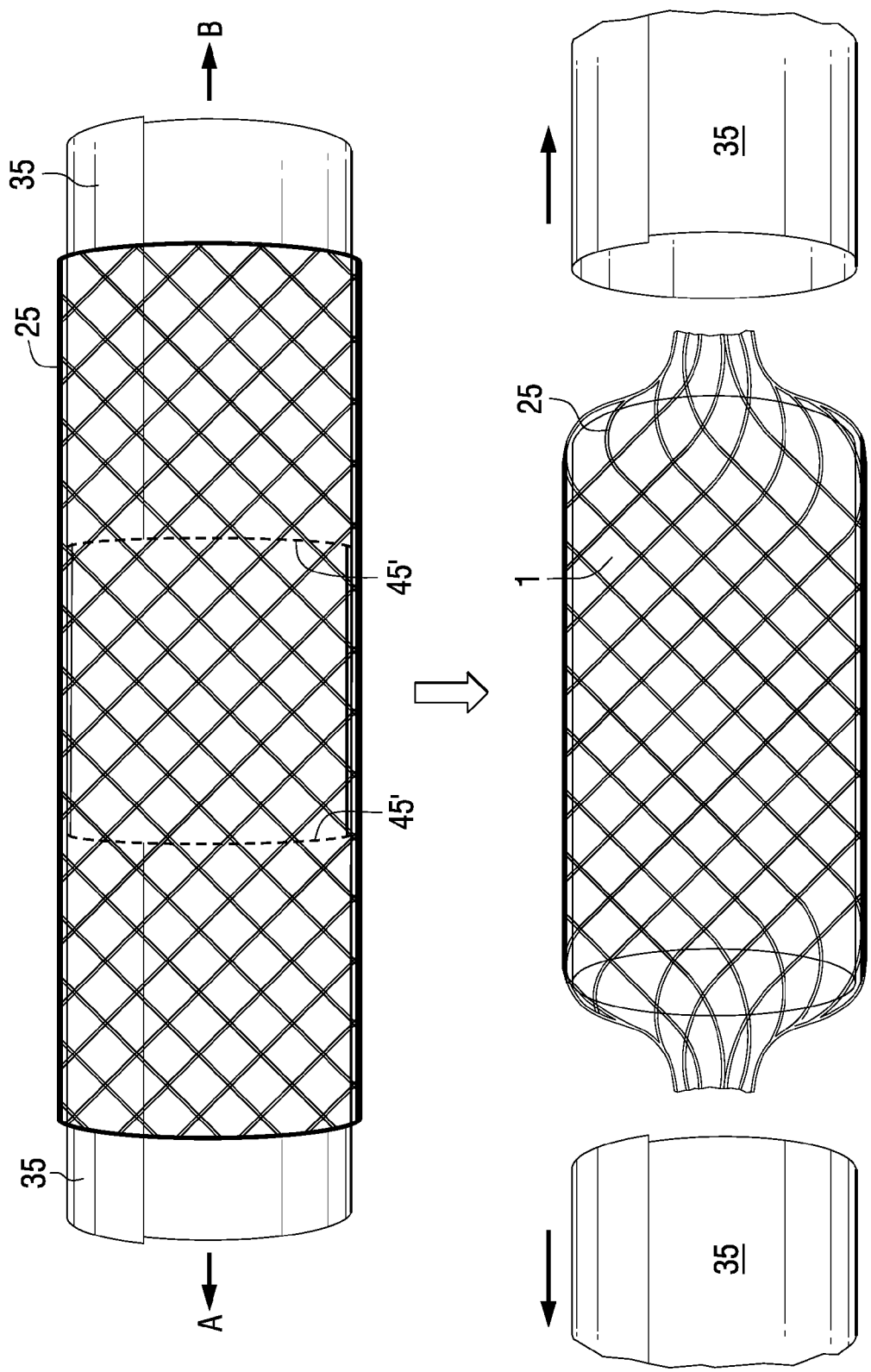
FIG. 8 illustrates through side elevational views the removal of the wrapping sheets from the roast within the net truss.

Referring now to FIGS. 6 and 7, roast 1 is positioned within elastomeric net 25 such that at least some portion of wrapper 35 extends outwardly from net truss opening 30 at each end of net truss 25. As show in subfigure A of FIG. 7, elastomeric net truss 25 is positioned along the length of roast 1 and in light of its compressive feature once released by the user is in close conformation with roast 1 having wrapper 35 surrounding it. Referring to FIG. 7(B) and FIG. 8, roast 1 is physically deformed or deflected by the user through the flexion of roast 1 in an arcuate manner causing longitudinal stress to be exerted along one side of roast 1 and more particularly with respect to wrapper 35 at perforation line 45. This force, when exerted to a degree sufficient to separate perforation line 45, is illustrated in FIG. 7(B). Alternatively, if roast 1 is too large or otherwise shaped so as to limit the longitudinal deflection in an arcuate manner sufficient to separate the wrapper 35 along perforation line 45, vertical or other compressive pressure may be exerted with the user's fingers or another implement to cause perforation line 45 to break, thereby separating the wrapper 35 into two sections without need for longitudinal deflection.

At this point, roast 1 may be manipulated by the user to cause perforation line 45 to separate along its entire circumferential length thus separating wrapper 35 into two separate pieces having perforated edges 45'. Each of these separate pieces as shown in FIG. 6(B) and FIG. 8 extends slightly outside of net truss 25 through net truss opening 30. The user may then grasp the extending edges of wrapper 35 from net truss 25 and slide each of the two halves of wrapper 35 outwardly from around roast 1 inside elastomeric net 25. The particular design of wrapper 35 incorporating materials having a low coefficient of friction with respect to elastomeric net 25 and roast 1 permits the easy removal of these wrapper halves without undue exertion and it is specifically designed to be within the strength and ability of a typical home or restaurant user.

It is appreciated that various modifications to the inventive concepts may be apparent to those skilled in the art without departing from the spirit and scope of the invention.

What is claimed is:

1. A wrapping apparatus for receiving and restraining food products, comprising:
   a preformed net truss having a generally cylindrical main body, open at each end along a central axis, said net truss exerting sufficient inward force on said food products to receive and restrain said food products as a mass; and
   at least one wrapping sheet circumferentially disposed around said food products, the combination of said at least one wrapping sheet and said food products being inserted into said net truss, said wrapping sheet being provided with a separable, transverse seam portion which permits the division of said at least one wrapping sheet into at least two wrapping sheets, each being axially slidably removable from said disposition around said food products, from respective open ends of said net truss.

2. The apparatus of claim 1 further comprising a plurality of said wrapping sheets longitudinally overlapped to form at least one overlap zone.

3. The apparatus of claim 1 further comprising an adhesive strip disposed on at least one side of said at least one wrapping sheet.

4. The apparatus of claim 3 further comprising a removable strip covering said adhesive strip.

5. The apparatus of claim 1 wherein said at least one wrapping sheet comprises a translucent flexible material of food grade quality.

6. The apparatus of claim 5 wherein said translucent material is selected from the group consisting of a food grade plastic, collagen, biaxially oriented polypropylene, cellophane, polyethylene, silicone, coated fabric, Teflon, mylar, vinyl wax, coated papers and a polymer.

7. The apparatus of claim 1 wherein said at least one wrapping sheet has a rectangular geometry.

8. The apparatus of claim 1 wherein said at least one wrapping sheet has a trapezoidal geometry.

9. The apparatus of claim 1 wherein said seam portion comprises a perforation line disposed on along the length of said at least one wrapping sheet.

10. The apparatus of claim 1, wherein said preformed net truss comprises an elastomeric material.

* * * * *